United States Patent [19]

Coon et al.

[11] 4,284,350
[45] Aug. 18, 1981

[54] LASER GEOPHONE

[75] Inventors: Julian B. Coon; Bobby J. Thomas; William L. Chapman, all of Ponca City, Okla.; James C. Fowler, Burke, Va.

[73] Assignee: Conoco, Inc., Ponca City, Okla.

[21] Appl. No.: 94,141

[22] Filed: Nov. 14, 1979

[51] Int. Cl.³ .................. G01P 3/36; G01B 11/02; G01B 9/02

[52] U.S. Cl. .................. 356/28.5; 73/657; 356/4.5; 356/356

[58] Field of Search .......... 356/28.5, 356, 4.5; 73/653, 655, 657

[56] References Cited

U.S. PATENT DOCUMENTS

| | | | |
|---|---|---|---|
| 3,373,401 | 3/1968 | Bayer | 73/653 |
| 3,523,735 | 8/1970 | Taylor | 356/356 |
| 3,601,491 | 8/1971 | Vaniz | 356/4.5 |
| 3,863,064 | 1/1975 | Doyle et al. | 455/605 |
| 4,026,655 | 5/1977 | Gunter, Jr. | 356/28.5 |
| 4,185,503 | 1/1980 | Saito | 73/653 |

Primary Examiner—S. C. Buczinski
Attorney, Agent, or Firm—William J. Miller

[57] ABSTRACT

A method for measuring the velocity of earth surface motion utilizing coherent light energy which comprises steps of generating and directing a coherent light beam toward a selected earth surface position, reflecting said beam from a stationary reflector located at the earth surface position, and simultaneously reflecting said beam from a reflector at said earth surface position which moves with earth surface motion; and, detecting the reflected beam, including both the reflection path components, to derive an instantaneous difference frequency that is proportional to the velocity of the earth surface motion.

9 Claims, 6 Drawing Figures

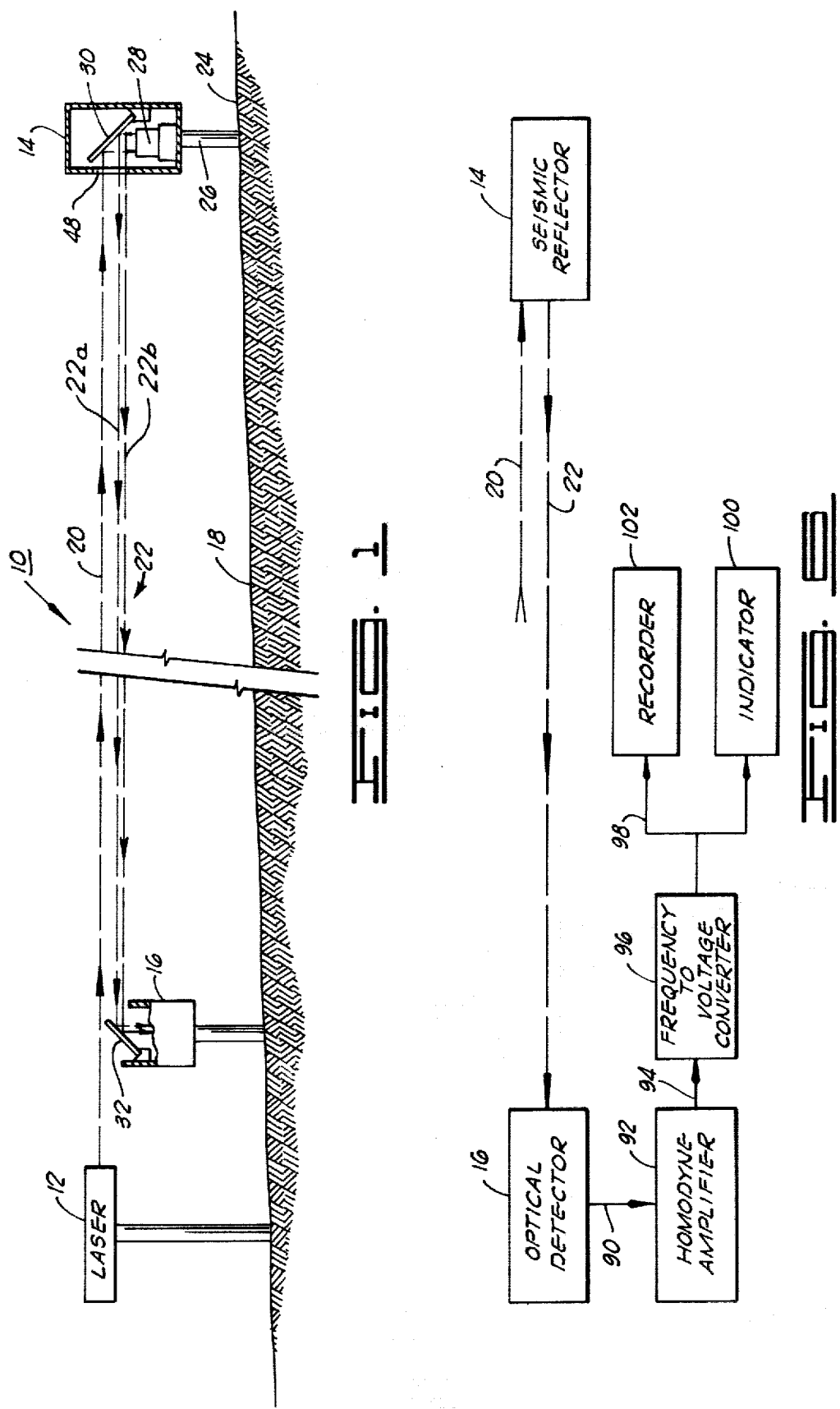

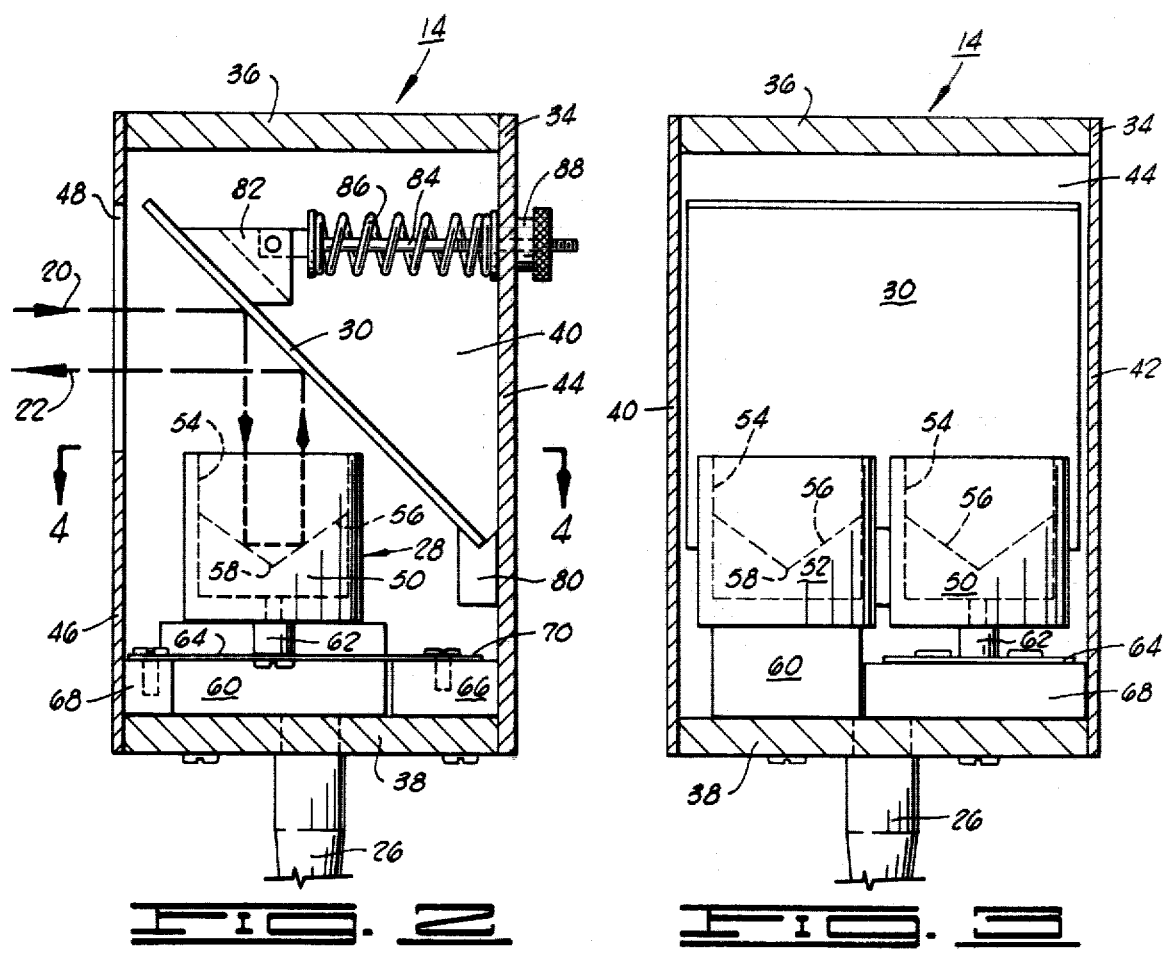

4,284,350

LASER GEOPHONE

BACKGROUND OF THE INVENTION

1. Field of the Invention

The invention relates generally to seismic energy detection devices and, more particularly, but not by way of limitation, it relates to a high sensitivity detection apparatus that utilizes laser beam energy for detection of the velocity of earth surface movement.

2. Description of the Prior Art

To the knowledge of this source the seismic art has not yet utilized light energy techniques for isolation of earth surface movement as caused by seismic energy vibrations. High frequency light energy, specifically the laser and related devices, has been utilized for various velocimetric purposes where the particular application lends itself to the surrounding physical conditions and exigencies of the particular application. For example, Doppler frequency measurement techniques are well-known in a number of radar-type applications as well as in certain measurement methods for fluid streams, turbulent layers in fluids and other forms of small amplitude vibration that occur in the various phases of non-destructive testing. In all of the applications known to the present Applicant, such measurement schemes take the form of beam transmission and transition patterns wherein the transmitted beam traverses a different space or path than the reflected beam or beams prior to detection and readout such that variations in the traversed matter will greatly affect the readout results as it relates to frequency and the attendant distance variations. That is, variations as to the travel paths of the high frequency light energy, e.g. as regards differences in the physical paths through air, constitution of the air and heat effects, will more often than not result in a total degredation of the finite measurement qualitites of the energy. This would be especially true as regards the minute variations to be encountered relative to seismic energy disturbances.

The closest prior art encountered today is believed to be the U.S. Pat. No. 3,409,369 in the name of Bickel, a laser radar application wherein the source-target-detector path is nearly along the same traverse; however, this application utilizes a still further differential frequency energy input in order to ascertain the velocity of moving objects under detection surveillance.

SUMMARY OF THE INVENTION

The present invention contemplates a method and apparatus wherein laser generated light energy is utilized to more accurately ascertain seismic energy vibrations as detected in the earth surface at a selected point of detection. The method utilizes a different mode of detection than has heretofore been used with higher frequency applications, and the method is particularly effective because of the fact that seismic energy detection responses are in a much lower frequency range than the known prior art applications of laser energy velocimetry.

The invention utilizes selected laser output as beamed from a source point to a selected earth site wherein it is desired to detect earth surface movement. Thereat, novel reflection equipment rigidly secured to the earth surface is capable of reflecting two components of energy, a first component indicative of earth movement and a second component indicative of comparison or reference energy that is not affected by earth surface movement. Both energy paths are very nearly identical as they travel in juxtaposition from source to reflection to detection such that the external interfering components tend to cancel out, and the final detection is able to produce a true surface movement indication free of all extraneous noise and destructive effects.

Therefore, it is an object of the present invention to provide a geophone structure utilizing coherent light energy that is extremely accurate and free from temporal variations due to the index of refraction of air such as may be caused by wind, temperature fluctuations, inhomogeneities in composition, etc.; thus, it eliminates apparent frequency shifts that affect the final movement readout.

It is another object of the invention to provide a seismic energy vibration detector that is extremely sensitive and accurate without undue attention to alignment and adjustment.

Finally, it is an object of the present invention to provide a seismic geophone utilizing laser energy that offers readout sensitivity and freedom from environmental interference far greater than present known laser velocimeter systems.

Other objects and advantages of the invention will be evident from the following detailed description when read in conjunction with the accompanying drawings which illustrate the invention.

BRIEF DESCRIPTION OF THE DRAWINGS

FIG. 1 is a schematic representation of a general form of application of the seismic detector-laser source apparatus;

FIG. 2 is a side elevation in section of the geophone reflector apparatus of the present invention;

FIG. 3 is a front view in elevation of the seismic reflector of the present invention;

FIG. 4 is a top view of the rectangular spring member.

FIG. 5 is a top view section taken along line 4—4 of FIG. 2; and

FIG. 6 is a block diagram of one form of energy detection and processing circuitry.

DETAILED DESCRIPTION OF THE INVENTION

As previously discussed, laser velocimetric systems are old in the art but these have generally taken the form of devices for use in very high frequency measurement applications resulting from velocities which are a factor of $10^6$ to $10^8$ larger than seismic velocities with which the present invention is concerned. Thus, these seismic velocities are generally two orders of magnitude smaller than the smallest measured velocities measured by the prior art systems.

One form of prior art system utilizes a laser beam source operating through a half-silvered beam splitter reflector to a stationary reflector with positioning of the test specimen perpendicular to the reference beam adjacent the beam splitter, and photo detection of energy change is effected on the opposite side of the beam splitter. Another form of prior art device utilizes a linear reference beam and an angularly deflected signal beam as deflected off the test specimen, both of the reference beam and deflected beam then being read by photo detectors to ascertain the Doppler shift and, subsequently, the speed of the movement of the vibrating object or specimen. In each case, the reference beams and signal beams are propagated through distinctly different air paths for some or all of their path lengths such that environmental variances due to atmosphere, heat changes, and other physical perturbances impose differing affects upon the transmitted signals.

As shown in FIG. 1, and as utilized for measuring and indicating velocities of seismic disturbance in an earth medium, FIG. 1 illustrates a seismic velocimetry apparatus 10 utilizing a laser source 12, a seismic reflector 14 and an optical detector 16 as disposed on an earth surface 18. While shown in idealized form, the laser 12 and optical detector 16 are located by suitable support structures as closely as practicable to provide a laser beam 20 for reflection at seismic reflector 14 and return via return path 22 along a signal path to optical detector 16. As will be further described, the effective coincidence of both a signal beam 22a and reference beam 22b along return path 22 eliminates the possibility of deleterious noice and perturbation effects since all such disturbances will affect each of the signal and reference beams equally so that they will cancel through subsequent signal processing.

The laser 12, a coherent, monochromatic light source, provides beam 20 of light for reflection by seismic reflector 14 as disposed at a detection site 24. Seismic reflector 14 is securely anchored in the ground or earth surface 18 by means of an anchor rod 26 so that earth movement at site 24 is effectively transferred to seismic reflector 14. Two components of energy are then reflected from a retroreflector assembly 28 and mirror 30 to return both a portion of reference energy and a portion of signal energy along return path 22 the signal energy having experienced a change in frequency that is proportional to the instantaneous velocity of movement of the seismic reflector 14, i.e. a Doppler effect change in frequency.

The multiple frequency content of return beam 22 is then detected within optical detector 16, e.g. a photodiode or well-known photomultiplier may be utilized for the optical electrical conversion at detector 16.

FIGS. 2, 3 and 5 illustrate the structure of seismic reflector 14 which serves to re-direct, both the coherent reference laser energy and the signal or velocity affected energy along signal beam path 22 to the optical detector 16. The seismic reflector 14 consists of a suitable frame 34, e.g. aluminum housing, consisting of top and bottom plates 36 and 38, side panels 40 and 42 secured thereto, a rear panel 44, and a front panel 46 having a generally rectangular entry aperture 48. The window of aperture 48 is formed to be broad enough to allow expanded laser beam entry for reflection at mirror 30 and retroreflector assembly 28 (See FIG. 2).

The retroreflector assembly 28 consists of a pair of proximately juxtaposed retroreflectors 50 and 52 (See FIG. 3) mounted within housing 34 adjacent baseplate 38. The retroreflectors 50 and 52 are each identical and a commercially available type having mirrored cylindrical inner side walls 54 and a retroreflective bottom surface consisting of a plurality of mirrored sectors 56 disposed within cylindrical side wall 54 and descending at optimum angle to apex 58 lying on the vertical axis of the respective retroreflectors 50 and 52. Thus, the retroreflectors serve to re-direct entering light rays along a parallel path in well-known manner.

The retroreflector 52 is rigidly mounted on a mounting block 60 as secured by suitable fasteners to the baseplate 38 of housing 34. The retroreflector 52 is thus rigidly secured within the housing 34 and will move in accordance with earth surface motion as transmitted through mounting rod 26 secured as by threaded fastening in the bottom side of baseplate 28. The retroreflector 50 is resiliently mounted by means of a mounting post 62 as secured to a spring member 64 that is suitable fastened between opposite mounting blocks 66 and 68 as secured to baseplate 38. Thus the retroreflector 50 is mounted on the spring member 64 to be effectively isolated from earth vibrations at frequencies above resonance, while the retroreflector 52 is mounted directly to the housing 34 and follows the earth surface motion. Due to this, the light beams reflected from retroreflector 50 and retroreflector 52 are Doppler shifted with respect to one another with a difference frequency $\Delta f$ that is equal to $(2v/c)f$ where $v$ is the instantaneous velocity of retroreflector 50 relative to retroreflector 52.

As stated, the retroreflector 50 is effectively isolated from earth vibrations at frequencies above resonance due to the resonant characteristics of spring member 64. As shown in FIGS. 4 and 5, the spring 64 consists of a mounting portion 70 extending to an opposite mounting portion 72 which terminates the rectangular spring member. A generally circular cut-out 74 is formed to suspend a central mounting ring 76 by a plurality of resilient, arcuate arm segments 78 therewithin. The mounting ring 76 then receives the post 62 and retroreflector 50 in resilient mounting having vertical spring motion.

The planar mirror 30 is supported at forty-five degrees to the incoming laser beam 20 as it is pivotally supported at its lower end by a suitable supporting block 80 as secured to rear panel 44. At the upper end of mirror 30, a bracket 82 is pivotally secured to an adjusting screw 84 retaining compression spring 86, and mirror 30 is adjustable from the back side of rear plate 44 by means of knurled nut 88. The approximately forty-five degree tilt angle of plane mirror 30 is a non-critical adjustment since the laser beam will be incident from almost a horizontal direction in nearly all field applications.

As shown in FIG. 6, readout of the detected Doppler frequency indicative of earth surface movement is relatively conventional in that both reference beam and signal beam energy reflected from seismic reflector 14 via beam 22 is detected by the optical detector 16 with output via line 90 to a selected homodyne amplifier 92 of conventional and commercially available type. The output from optical detector 16 includes an output signal at frequencies of both the reference beam and the signal beam, and the homodyne amplifier 92 provides an A-C output at lead 94 with a frequency equal to the difference between the reference frequency and the signal frequency. The difference frequency $\Delta f$, or Doppler signal, then provides a direct indication of earth surface movement at earth surface site 24, and the signal on lead 94 is supplied for further processing to derive seismic output indication of such movement. For example, lead 94 may be applied as input to a frequency to voltage converter 96 and the output on lead 98 is further processed to provide output indication of earth movement. The output voltage may then be applied to an indicator 100 for instantaneous visual observation, and/or it may be applied to a suitable form of seismic recorder 102 to provide the conventional forms of seismic reflection profile or related readouts.

In operation, the present invention relies upon the fact that the equipment deals with relatively small velocities under adverse measurement conditions. Wind and other thermally generated temporal variations in the index of reflection of the transmitting medium (air) may cause apparent frequency shifts which easily obscure the small Doppler effect that results from seismic motion. Thus, the present system is designed so that the light source will not suffer frequency shifts greater than the Doppler shift frequency during the measurement period.

The Doppler frequency shift produced by the light beam of initial frequency f and incident normally upon a reflector of instantaneous velocity v, is given by $\Delta f = (2v/c)f$, where c is the velocity of light in the transmitting medium. A factor of $$\gamma = \left(1 - \frac{v^2}{C^2}\right)^{\frac{1}{2}} \quad (1)$$

has been omitted since it supplies a neglible correction for v/c is less than or equal to 0.01. If $\Delta f_s$ is the frequency change of the source, then it is required that $\Delta f_s$ be less than or equal to $\Delta f$. Thus, we find $$\frac{\Delta f_s}{f} \leq 2 v/c \cong \frac{3 \times 10^{-4} \text{ cm/sec}}{3 \times 10^{10} \text{ cm/sec}} \cong 10^{-14} \quad (2)$$

which is stability requirement for the light source.

Referring to FIG. 1, the laser 12, e.g. a He-Ne Laser, directs its beam 20 toward the seismic reflector 14, as firmly anchored in the earth surface at the site 24 by means of rod 26. Seismic reflector 14, as it includes mirror 30 and retroreflectors 50 and 52 (FIG. 2), is aligned with its receiving window or slot 48 open to beam 20 while also directing return of frequency varied light on beam 22 back for detection at optical detector 16 along the identical (or closely spaced) ray pathes. The reflected light beam 22 as received at optical detector 16 will be composed of approximately an equal mixture of reflected light from retroreflectors 50 and 52 will differ in phase by an amount $$\phi(t) = (4\pi f/c) \int_{t_0}^{t} v(t')dt' \quad (3)$$

at any instant in time. It may be noted that $$\phi(t) = (4\pi f/c)x(t) \quad (4)$$

where x(t) is the relative displacement of retroreflectors 50 and 52 due to the vibration of the earth. The optical detector 16 then produces an A-C signal proportional to cos $\phi$ so that we may represent the output from homodyne amplifier 92 by $$E = E_0 \cos \phi \quad (5)$$

By measurement of E, information regarding $\phi$, and thus x(t) or v(t), is provided.

It is important to note that with a design such as disclosed herein, the reference beam and the signal beam along path 22 experience an almost identical optical environment, i.e. over the the entire optical return path of the system. Apparent frequency shifts due to atmospheric fluctuations (noise) which occur in the reference beam will also occur in the signal beam. Thus, both beams 22a and 22b on return path 22 receive an identical noise frequency contribution so that the output from homodyne amplifier 92 will result in only signal date representing $f_{ref} - f_{sig}$ which is equal to $f_{Doppler}$, and the net noise frequency, which can often be several times the frequency of the Coppler shift, will be eliminated.

By contrast, in prior type of velocimeter systems, the reference beam and the signal beam traveled along completely different physical paths such that their noise contribution could not cancel out, and could in fact override the useable shift frequency indications.

The foregoing discloses a novel laser velocimeter system as particularly utilized with relatively lower frequency seismic energy induced velocities. The system utilizes the concept of forcing the reference and signal beams to travel in the exact or near coincident beam paths between the retroreflector and photodetector such that there is effective elimination of all forms of atmospherically induced noise frequency shift upon difference processing. The system also uses corner retroreflectors in a manner which is designed to enable the return of the laser beam to it source without critical mechanical adjustment. Further, it is well to note that any Doppler shift due to transverse displacement of retroreflectors is largely self-cancelling and thereby eliminates as yet another source of undesired frequency shift.

Changes may be made in the combination and arrangement of elements as heretofore set forth in the specification and shown in the drawings; it being understood that changes may be made in the embodiments disclosed without departing from the spirit and scope of the invention as defined in the following claims.

We claim:

1. A method for measuring the velocity of earth surface motion, comprising steps of:
   generating and directing a coherent light beam toward a selected earth surface position;
   reflecting said directed coherent light beam as a reference beam from a reflector at said position;
   reflecting said directed coherent light beam as a signal beam from a second resiliently mounted reflector moving with vertical motion of said earth surface at said position; and
   detecting said reflected beam, which includes both the reference and the signal beam reflection path components, to derive an instantaneous difference frequency that is proportional to velocity of the earth surface motion.

2. A method as set forth in claim 1 wherein:
   said reference and signal beam paths are similar to enable cancellation of unwanted atmospheric noise effects from a finally derived difference frequency.

3. Apparatus for determining earth surface movement at a selected earth site comprising:
   1st means attached to said earth site for directing a beam of coherent energy over said earth site;
   2nd means attached to said earth site and spaced from said 1st means intercepting said beam and for re-directing said beam in two components, a reference beam being affected by movement of said 2nd means, and a signal beam being affected by movement of said 2nd means and an impressed signal responsive to vertical movement of the earth site; and
   means for receiving said first and second re-directed beams and detecting frequency difference that is proportional to vertical earth surface movement at said earth site.

4. Apparatus as set forth in claim 3 wherein said means for directing comprises:

a source of collimated, monochromatic light energy.

5. Apparatus as set forth in claim 4 wherein said source comprises:

a helium-neon laser beam generator.

6. Apparatus as set forth in claim 3 wherein said means intercepting comprises:

frame means securely anchored in the earth surface at said selected earth site;

first reflector means intercepting said beam and being secured rigidly to said frame means; and second reflector means intercepting said beam and being resiliently secured to said frame means.

7. Apparatus as set forth in claim 4 wherein said means intercepting comprises:

frame means securely anchored in the earth surface at said selected earth site;

first reflector means intercepting said beam and being secured rigidly to said frame means; and second reflector means intercepting said beam and being resiliently secured to said frame means.

8. Apparatus as set forth in claim 3 wherein said means for receiving comprises:

detector means illuminated by said first and second re-directed beams to generate an electrical output indicative thereof;

homodyne amplifier means receiving the electrical output from said detector means to generate a frequency difference output that is proportional to surface movement at said earth site.

9. Apparatus as set forth in claim 8 which is further characterized to include:

means receiving the electrical output of said homodyne amplifier means to generate a visible time analog indicator of said earth surface movement.

* * * * *